United States Patent

[11] 3,601,795

[72] Inventors Tetsuji Shimizu
  Nagoya;
  Shozo Naito, Ama-gun; Hiroshi Tanaka, Motosu-gun, all of, Japan
[21] Appl. No. 838,521
[22] Filed July 2, 1969
[45] Patented Aug. 24, 1971
[73] Assignee Kabushiki Kaisha Tokai Rika Denki Seisakusho
  Oaza-shimoodia, Nishibiwajimacho, Nishikasugar-gun, Aichi Prefecture, Japan
[32] Priority July 9, 1968
[33] Japan
[31] 43-47735

[54] ELECTRIC CIRCUIT ENERGIZING LAMPS OF A VEHICLE
2 Claims, 1 Drawing Fig.

[52] U.S. Cl. .................................................. 340/67,
  307/293, 340/82, 340/176
[51] Int. Cl. .................................................. B60q 1/38
[50] Field of Search ........................................ 340/82, 67

[56] References Cited
UNITED STATES PATENTS
| | | | |
|---|---|---|---|
| 3,315,227 | 4/1967 | Du Rocher ................... | 340/82 |
| 3,470,531 | 9/1969 | Hayden et al. ................ | 340/251 X |
| 3,500,312 | 3/1970 | Stankovich ................... | 340/67 |
| 3,500,315 | 3/1970 | Shimada ...................... | 340/82 |
| 3,504,338 | 3/1970 | Breece ........................ | 340/82 |

Primary Examiner—John W. Caldwell
Assistant Examiner—Kenneth N. Leimer
Attorney—B. Edward Shlesinger ABSTRACT: This circuit controls two groups of lamps at the rear of a vehicle adjacent the right and left sides thereof, respectively, and two directional lamps on the front of the vehicle adjacent opposite sides thereof. It includes the usual brake-operated switch for simultaneously illuminating all of the lamps on the rear of the vehicle, two manually operable directional signals for selectively energizing one of the two rear groups of lamps for successive and cyclical energization concurrently with the intermittent energization of the corresponding front directional lamp, and a plurality of hazard switches for causing selective lamps at the front and rear of the vehicle to be energized intermittently, and independently of the operation of the brake and directional switches.

PATENTED AUG 24 1971
3,601,795
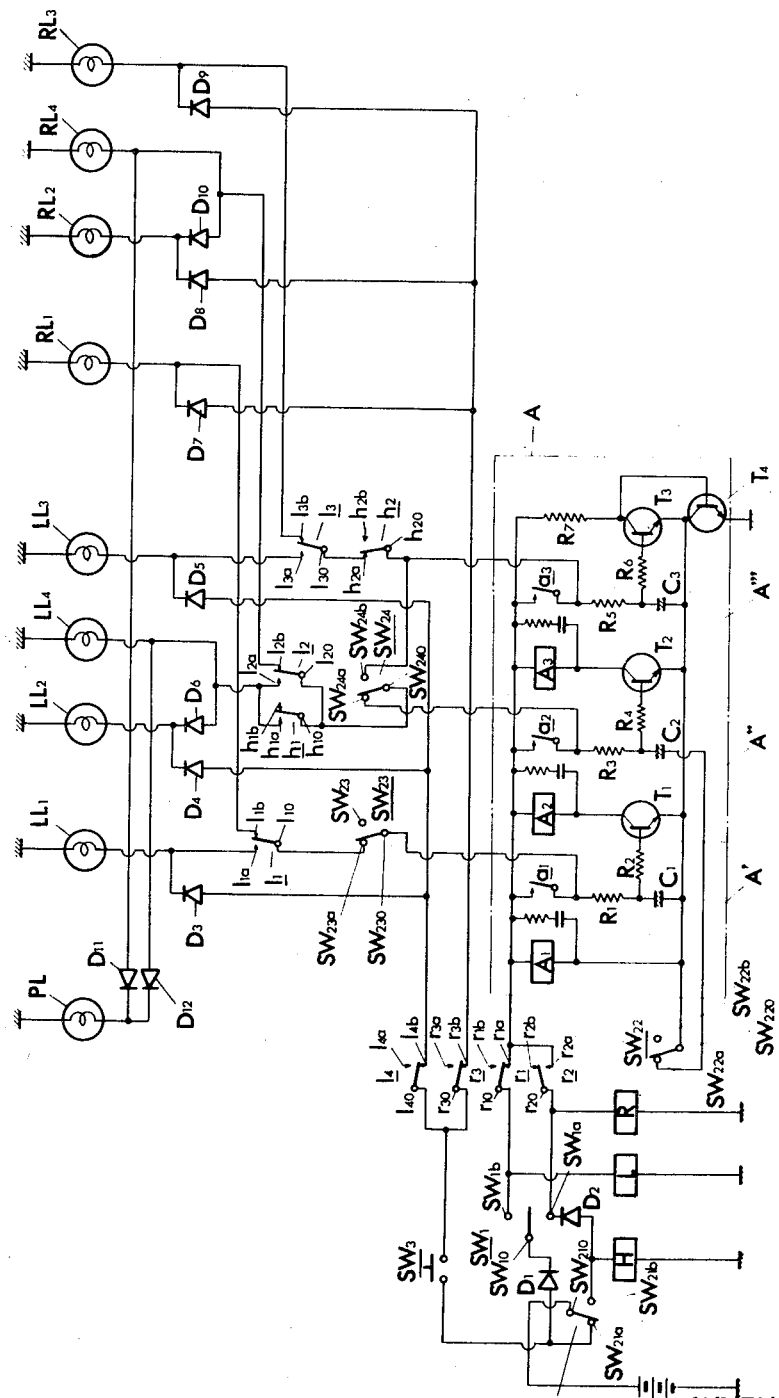
INVENTORS
Tetsuji Shimizu,
BY Shozo Naito, and
Hiroshi Tanaka
Attorney

ELECTRIC CIRCUIT ENERGIZING LAMPS OF A VEHICLE

The present invention relates to an electric circuit common to winker lamps, brake lamps and hazard lamps of a vehicle, especially of an automobile, and capable of energizing or deenergizing some or all of said lamps as one desires.

An object of the present invention is to provide an electric circuit of an automobile so arranged as to be connected to a group of lamps which serve as winker or direction indicator lamps, brake lamps and hazard lamps, and to energize desired numbers of these lamps by selection of switches.

Another object of the present invention is to provide an electric circuit so adapted that, when the switch for brake lamps and switch for winker lamps are simultaneously turned to operative positions, lamps serving as direction indicators are energized and deenergized preferentially to the brake lamps.

A further object of the present invention is to provide an electric circuit so adapted that, when the switches for hazard lamps are turned to an operative position, all or desired numbers of said group of lamps are simultaneously energized or deenergized, energization or deenergization of said lamps then being not controlled by operation of the brake switch and direction indicator switch.

A still further object of the present invention is to provide an electric circuit for energizing a group of lamps of an automobile so constructed that plural relays are provided so as to energize or deenergize any of direction indicator lamps, brake lamps or hazard lamps selectively and automatically, according to operation of corresponding switches, and that it is produced at a lower cost compared with that having transistors incorporated therein.

The accompanying drawing is a diagram of an electric circuit relating to the present invention, wherein references LL1, LL2 and LL3 are a group of lamps on the rear-left side of an automobile; LL4 is a front-left side direction indicator lamp; RL1, RL2 and RL3 are a group of lamps on the rear-right side of an automobile; RL4 is a front-right side direction indicator lamp, and PL is a pilot lamp provided within the car.

SW1 is a switch for direction indicator lamps having two contacts and connected to one electric circuit. SW21, SW22, SW23 and SW24 are a group of switches for hazard lamps, consisting of four electric circuits and each having two contacts. These switches may close circuits when the automobile is stopped on the road due to the traffic accident such as puncture of tires. These switches are referred to, for explanatory convenience, as a first switch SW21, a second hazard switch SW22, a third hazard switch SW23 and a fourth hazard switch SW24, respectively. SW3 is a brake switch of a push button type which is automatically turned to an operative position by operating the brake pedal.

Connection is as follows.

The first hazard switch SW21 has a movable terminal SW210 connected to the positive pole of a potential source B such as battery, one fixed terminal SW21a connected to a movable terminal SW10 of the direction indicator switch SW1 through the normal direction of a diode D1 and further connected to the brake switch SW3, and another fixed terminal SW21b connected to a fixed terminal SW1a of direction indicator switch SW1 through the normal direction of a diode D2 and further connected to the winding or coil of relay H interconnected between said fixed terminal SW21b and diode D2, and grounded at one side.

The direction indicator switch SW1 has a fixed terminal SW1a connected to winding or coil of relay R grounded at one side and to a movable terminal r20 of a second contact r2 of said relay R, and another fixed terminal SW1b connected to winding or coil of relay L grounded at one side and to a movable terminal r10 of a first contact r1 of said relay R.

The fixed terminals r1a and r2a of the first and second contacts r1 and r2 of said relay R are connected to each other, and a junction point therebetween is connected to one side of respective coils of relays A1, A2 and A3 respectively arranged at a first stage circuit A', a second stage circuit A" and a third stage circuit A''' of a sequentially energizing circuit A, and respective fixed terminals of contacts a1, a2 and a3 of said relays A1, A2 and A3, and further connected to collector of transistor T3 through resistor R7.

Other terminal of coil of relay A1 is connected to emitter of transistor T1, and a movable terminal of the contact a1 of said relay A1 is also connected to emitter of transistor T1 through resistor R1 and capacitor C1 and further connected to base of said transistor T1 through a junction point between said resistor R1 and capacitor C1, and resistor R2.

The relay A2 is connected at other terminal of coil thereof to collector of transistor T1, and a movable terminal of contact a2 of said relay A2 is connected to a fixed terminal SW22a of the second hazard switch SW22 through resistor R3 and capacitor C2, and further connected to base of transistor T2 through a junction point between said resistor R3 and capacitor C2, and through resistor R4.

A fixed terminal SW22b of the second hazard switch SW22 is left open.

In a similar manner, the relay A3 is connected at other terminal of coil thereof to collector of transistor T3, and a movable terminal of contact a3 of said relay A3 is connected to emitter of transistor T3 through resistor R5 and capacitor C3, and further connected to base of said transistor T3 through a junction point between said resistor R5 and capacitor C3, and through resistor R6.

Emitters of said transistors T1, T2 and T3 are connected to collector of transistor T4 and further connected to a movable terminal SW220 of said second hazard switch SW22 through junction points among said transistors T1, T2 and T3.

Base of transistor T4 is connected to collector of transistor T3 and emitter of said transistor T4 is grounded.

Movable terminals of contacts a1, a2 and a3 of relays A1, A2 and A3 are connected to a movable terminal SW230 of the third hazard switch SW23, a fixed terminal SW24a of the fourth hazard switch SW24 and a movable terminal h20 of a second contact h2 of said relay H, respectively. A fixed terminal h2b of said second contact h2 is left open.

A fixed terminal SW23a of third hazard switch SW23 is connected to a movable terminal l10 of a first contact l1 of relay L, while a fixed terminal l1a of said first contact l1 is grounded through the load LL1 and another fixed terminal l1b thereof is grounded through the load RL1.

A movable terminal SW240 of fourth hazard switch SW24 is connected to a junction point between a movable terminal h10 of a first contact h1 of relay H and a movable contact l20 of the second contact l2 of relay L, and a fixed terminal SW24b of said fourth hazard switch SW24 is connected to a movable terminal h20 of a second contact h2 of relay H.

A fixed terminal h1a of first contact h1 of said relay H is connected to a fixed terminal l2a of second contact l2 of relay L. A junction point therebetween is connected to the load LL2 through the normal direction of diode D6 and a junction point between said diode D6 and the fixed terminal l2a is connected to the load LL4. These loads LL2 and LL4 are grounded at the other sides thereof.

A fixed terminal h1b of first contact h1 of relay H is left open.

A fixed terminal l2b of second contact l2 of relay L is connected to the load RL2 through the normal direction of diode D10, and a junction point between said diode D10 and fixed terminal l2b is connected to the load RL4, while these loads RL2 and RL4 are grounded at the other sides thereof. A fixed terminal h2a of said second contact h2 of relay H is connected to a movable terminal l30 of third contact l3 of relay L, and a fixed terminal l3a of said contact l3 is grounded through the load LL3.

The fixed terminal SW21a of first hazard switch SW21 is connected to a junction point between a movable terminal l40 of fourth contact l4 of relay L and a movable terminal r30 of third contact r3 of relay R through a junction point between diode D1 and said terminal SW21a, and the diode D1 and brake switch SW3.

A fixed terminal l4b of fourth contact l4 of relay L is connected to positive sides of respective loads LL1, LL2 and LL3 through the normal direction of respective diodes D3, D4 and D5.

A fixed terminal r3b of third contact r3 of relay R is connected to positive sides of respective loads RL1, RL2 and RL3 through the normal direction of respective diodes D7, D8 and D9.

Fixed terminals l4a and r3a are left open.

The loads LL4 and RL4 are connected to one side of the pilot lamp PL through the normal direction of diodes D11 and D12, respectively, and the pilot lamp PL is grounded at other side.

The thus connected electric circuit operates as follows.

I. In the case that the direction indicator switch SW1 is turned to contact the movable contact SW10 with the fixed terminal SW1a, current flows from the potential source B to relay R through the fixed terminal SW21a, diode D1 and the fixed terminal SW1a of direction indicator switch SW1, so that the relay R is actuated to excite the first, second and third contacts r1, r2 and r3.

Thus, said second contact r2 is closed, and current flows to base of transistor T4 through resistor R7 so that said transistor T4 becomes conductive, thereby actuating relay A1 to move the contact a1 thereof to a closed position. Resultantly, current flows through the fixed terminal SW23a of third hazard switch SW23, the fixed terminal l1b of first contact l1 of relay L, thereby energizing the load RL1. By closing the contact a1, current further flows through resistor R1 to charge capacitor C1, so that current flows to base of transistor T1 to make it conductive, thereby actuating relay A2 to move the contact a2 thereof to a closed position. Thus, current flows through the movable terminal SW240 of fourth hazard switch SW24, the fixed terminal l2b of second contact l2 of relay L and diode D10, thereby energizing the loads RL2 and RL4.

Current, when the contact a2 is closed, further flows through resistor R3 to charge capacitor C2, so that current flows to base of transistor T2 to make said transistor conductive, thereby actuating relay A3 to move the contact a3 to a closed position.

Resultantly, current flows through the fixed terminal h2a of second contact h2 of relay H and the fixed contact l3b of third contact l3 of relay L, thereby energizing the load RL3.

It will be clearly understood that by the sequential actuation of relays A1, A2 and A3, the loads RL1, RL2, RL4 and RL3 are energized in sequence through fixed terminals l1b, l2b and l3b of first, second and third contacts of relay L. That is to say, relay A1 of the first stage A' is actuated simultaneously when transistor T4 becomes conductive, and relays A2 and A3 of succeeding stages are actuated in succession at a fixed time interval. Time interval or time lag between actuation of a preceding relay and that of succeeding relay depends upon time constant of resistor R and capacitor C. In detail, time lag between actuation of second stage A'' and that of third stage A''' depends upon time constant of resistor R1, capacitor C1, and resistor R3 and capacitor C2, respectively.

In the same way, relay A3 of the final stage is actuated to turn the contact a3 to a closed position, and current flows through resistor R5 to charge capacitor C3, so that current flows to base of transistor T3 through resistor R6, thereby transistor T3 becomes conductive, and transistor T4, in turn, becomes nonconductive. As a result, current is cut off throughout circuits of respective stages.

Note that transistor T3 is maintained conductive and transistor T4 is maintained nonconductive, after electric circuits of respective stages have been turned nonconductive and until current discharge by capacitor C3 is finished.

As soon as this current discharge of C3 is finished, the operation as described above is performed, which is repetitive.

It is noted that the first contact r1 of relay R is turned to an opened position by actuation of said relay R, so as to control operation of relay L.

Diode D2 is provided for preventing current flow to relay H when the fixed terminal SW1a of direction indicator switch SW1 is closed.

In the case that the direction indicator switch SW1 is operated leftwards to move the movable contact SW10 into contact with the fixed terminal SW1b, the relay L is actuated to turn each of first, second and third contacts l1, l2 and l3 to a position opposite to that in the former case, so that relays of respective stages A', A'' and A''' are sequentially actuated to energize the loads LL1, LL2, LL4 and LL3 successively.

In this case, the sequentially energizing electric circuit A is connected to the potential source B through the first or normally closed contact r1 of relay R, and operation as described in the foregoing passages is repeatedly performed. At this time the relay R is not held actuated since the second contact r2 is now in the opened position.

II. In the case that the brake switch SW3 is operated, for example, by operating the brake pedal, current flows, through the fixed terminal SW21a of hazard switch SW21 and said brake switch SW3, from the potential source B to the third contact r3 of relay R and the fourth contact l4 of relay L, so that current flows through two electric circuits, that is, current flows from the fourth contact l4 to the loads LL1, LL2 and LL3 through diodes D3, D4 and D5, respectively, thereby energizing respective loads LL1, LL2 and LL3 and from the third contact r3 to loads RL1, RL2 and RL3 through diodes D7, D8 and D9, thereby energizing respective loads RL1, RL2 and RL3.

It will be easily understandable that when the brake switch SW3 is closed, six loads are simultaneously energized, but the loads LL4 and RL4 are not energized because current does not flow through the reverse direction of diodes D6 and D10, and therefore, the pilot lamp is not energized.

III. In the case that the direction indicator switch SW1 and brake switch SW3 are operated simultaneously, that is, if the direction indicator switch SW1 is operated to turn the movable contact leftwards or rightwards, either of relays L and R becomes actuated, so that either of third contact r3 of relay R and fourth contact l4 of relay L is moved to an opened position to break the corresponding circuit. Hence, if the brake switch SW3 is closed, current from said switch SW3 flows only to one circuit where the contact is closed, but does not flow to other circuit where the contact is opened. In consequence, either the left group of lamps or the right are sequentially energized.

Meanwhile, the other group of lamps, excluding the lamps LL4 or RL4, are energized simultaneously by operation of the brake switch SW3. In short, if the brake switch SW3 and direction indicator switch SW1 are operated simultaneously, one group of lamps on one side are energized sequentially, while other group of lamps on other side are simultaneously energized.

IV. Before considering the case in which a series of hazard switches respectively are turned to operative positions, note that these switches SW21, SW22, SW23 and SW24 are normally maintained in closed positions with their movable contacts SW210, SW220, SW230 and SW240 kept in contact with fixed terminals SW21a, SW22a, SW23a and SW24a. Now, when these respective switches are turned over to operative positions to move the movable contacts SW210, SW220, SW230 and SW240 into contact with other fixed terminals SW21b, SW22b, SW23b and SW24b, the relays H and R are actuated by SW21 to turn the second contact r2 of said relay R to a closed position, whereby current flows to the sequentially energizing circuit A. The first contact r1 of relay R is moved to an opened position, hence the relay L is not actuated.

The second hazard switch SW22, of which movable contact SW220 contacts with the fixed terminal SW22b, acts to cut off connection between capacitor C2 and emitter of transistor T2, and resultantly, relay A2 of second stage A″ and relay A3 of third stage A‴ are actuated at the same time. The third hazard switch SW23 is turned to the opened position to cut off current flow to the loads LL1 and RL1. Consequently, the loads LL1 and RL1 are not energized at this time.

The fourth hazard switch SW24 acts to turn the electric circuit A″ of second stage to the circuit A‴ of third stage, current flows to the loads LL2 and LL4 through the movable contact h10 now in contact with the fixed contact h1a by actuation of relay H, thereby energizing the loads LL2 and LL4.

The movable contact l20 of second contact l2 is held in its initial position in contact with the fixed terminal l2b, so that the loads RL2 and RL4 are energized, meanwhile since the second contact h2 of relay H is turned opened at this time, the loads LL3 and RL3 are not energized.

When the hazard switches are in their active positions, the circuit including the potential source B, the direction indicator switch SW1 and brake switch SW3 is cut off. Therefore, if the direction indicator switch SW1 is turned to contact the movable contact SW10 with the fixed terminal SW1b, and the brake switch SW3 is turned to a closed position, neither the relay L is actuated, nor loads connected to the brake circuit are energized.

If the direction indicator switch SW1, however, is turned to contact its movable contact SW1a with the fixed terminal SW1a, current flows through the movable terminal SW10, but does not flow through the diode D1 interconnected in the reverse direction.

In short, a series of hazard switches SW21, SW22, SW23 and SW24 act to energize or deenergize the loads LL2, LL4, and RL2, RL4. It is obvious that, when these hazard switches are in operative positions, the direction indicator switch SW1 and brake switch SW3, if turned to operative positions, do not affect on operation of said switches. The pilot lamp PL is energized through the normal direction of diode D11 and D12 only when the loads LL4 and RL4 are energized.

The electric circuit of the present invention so constructed that, in a group of lamps for combination use as direction indicator lamps, hazard lamps and brake lamps, selective energization of lamps is permitted by operating any switch for intended lamps; in the case that all switches are simultaneously operated, direction indicator lamps are preferentially energized; energization or deenergization of these lamps is effected by plural relays; in the case that plural hazard switches are operated, predetermined lamps of left and right sides are energized or deenergized simultaneously, irrespective of operation of either direction indicator switch or brake switch.

The electric circuit having such construction has advantages that the structure is simple and its manufacturing cost is low.

What We claim is:

1. An electric circuit for selectively energizing two groups of lamps symmetrically arranged on a vehicle adjacent the left and right sides thereof, respectively, comprising
    a brake switch operable by the brake of said vehicle,
    a direction indicator switch manually movable selectively into engagement with first and second contacts, respectively, selectively to supply power thereto from a power source,
    a transistor operative to be switched from a nonconductive to a conductive state, when said indicator switch is engaged with one of said contacts,
    a sequentially energizing circuit for cyclically and successively energizing the lamps of one of said groups, when said transistor is conducting,
    a first relay connected to one of said contacts of said direction indicator switch and having a first set of contacts for selectively connecting each of said groups of lamps to the corresponding stages of said sequentially energizing circuit, and having a further contact connected between said brake switch and one of said groups of lamps,
    a second relay connected to the other contact of said direction indicator switch and having a first set of contacts between said contacts of said direction indicator switch and said sequentially energizing circuit, and having a further contact connected between said brake switch and the other of said groups of lamps, and
    a group of hazard switches comprising a first switch connected between said power source and said second relay and adapted to connect said sequentially energizing circuit to said power source through one of said first set of contacts of said second relay, when said second relay is energized, a second switch connected between selected lamps of each group thereof and said sequentially energizing circuit, and further switches connected between the lamps other than said selected lamps and said sequentially energizing circuit, said direction indicator switch being operable to actuate said transistor and selectively to energize one of said relays and resultantly to actuate said sequentially energizing circuit through one of said first set of contacts of said second relay to apply an output of each stage of said sequentially energizing circuit selectively to one of said groups of lamps through said first set of contacts of said first relay, thereby performing a sequential lighting of the lamps of the last-named group,
    said group of hazard switches being operable to energize said second relay by the operation of said one switch thereby to actuate said sequentially energizing circuit, and to disconnect said lamps other than said selected lamps from said sequentially energizing circuit by the operation of said further switches, and electrically to connect only said selected lamps to said sequentially energizing circuit by the operation of said second switch, thereby performing a flashing of the selected lamps only, and
    means responsive to the operation of said brake switch to light all the lamps through said further contacts of said relays, when the latter are not energized.

2. An electric circuit for selectively energizing lamps of a vehicle as claimed in claim 1, wherein
    each of said stages comprises a transistor, a relay and a time constant circuit formed of a resistor and a condenser, and
    said group of hazard switches further comprises a switch connected between the condensers of at least one of the respective stages of said sequentially energizing circuit, except the condenser of the final stage, and one of the common lines of said multistage circuit, thereby to disconnect said at least one of said condensers from a grounding line.